(12) United States Patent
Kim et al.

(10) Patent No.: US 11,027,653 B2
(45) Date of Patent: Jun. 8, 2021

(54) APPARATUS, SYSTEM AND METHOD FOR PREVENTING COLLISION

(71) Applicant: MANDO CORPORATION, Pyeongtaek-si (KR)

(72) Inventors: Tak Gen Kim, Seongnam-si (KR); Jae Suk Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/696,602

(22) Filed: Nov. 26, 2019

(65) Prior Publication Data

US 2020/0238904 A1 Jul. 30, 2020

(30) Foreign Application Priority Data

Jan. 28, 2019 (KR) .................. 10-2019-0010636

(51) Int. Cl.
| | |
|---|---|
| *B60W 30/09* | (2012.01) |
| *B60Q 9/00* | (2006.01) |
| *B60W 10/20* | (2006.01) |
| *B60W 50/14* | (2020.01) |
| *G08G 1/16* | (2006.01) |

(52) U.S. Cl.
CPC .............. *B60Q 9/008* (2013.01); *B60W 10/20* (2013.01); *B60W 30/09* (2013.01); *B60W 50/14* (2013.01); *G08G 1/166* (2013.01); *B60W 2554/00* (2020.02)

(58) Field of Classification Search
None
See application file for complete search history.

(56) References Cited

U.S. PATENT DOCUMENTS

| | | | | | |
|---|---|---|---|---|---|
| 5,646,612 | A | * | 7/1997 | Byon | .................... G01S 13/931 340/903 |
| 2008/0055114 | A1 | * | 3/2008 | Kim | ........................ G01S 15/86 340/937 |
| 2014/0309884 | A1 | * | 10/2014 | Wolf | .................. G06K 9/00805 701/41 |
| 2018/0180432 | A1 | * | 6/2018 | Surnilla | ............. G01C 21/3492 |
| 2020/0122773 | A1 | * | 4/2020 | Deshpande | ............... B60T 7/22 |
| 2020/0156626 | A1 | * | 5/2020 | Mamchuk | ............. B60W 10/04 |

FOREIGN PATENT DOCUMENTS

| | | |
|---|---|---|
| KR | 10-2012-0056158 A | 6/2012 |
| KR | 10-2018-0101008 A | 9/2018 |

\* cited by examiner

*Primary Examiner* — Brent Swarthout
(74) *Attorney, Agent, or Firm* — Morgan, Lewis & Bockius LLP

(57) ABSTRACT

The present disclosure is provided to a collision avoidance apparatus, system and method, configured to calculate a velocity vector of a following vehicle located behind the vehicle in the driving lane in which the vehicle is driving based on at least one of the image data and the sensing data, calculate a collision risk range between the vehicle with the following vehicle based on the driving data and the velocity vector, calculate a time to collision within the collision risk range, and output a warning based on the time to collision. According to the present disclosure, warning and control may be performed according to the collision risk range and the time to collision calculated using the velocity vector of the following vehicle, thereby preventing collision with an adjacent following vehicle.

17 Claims, 10 Drawing Sheets

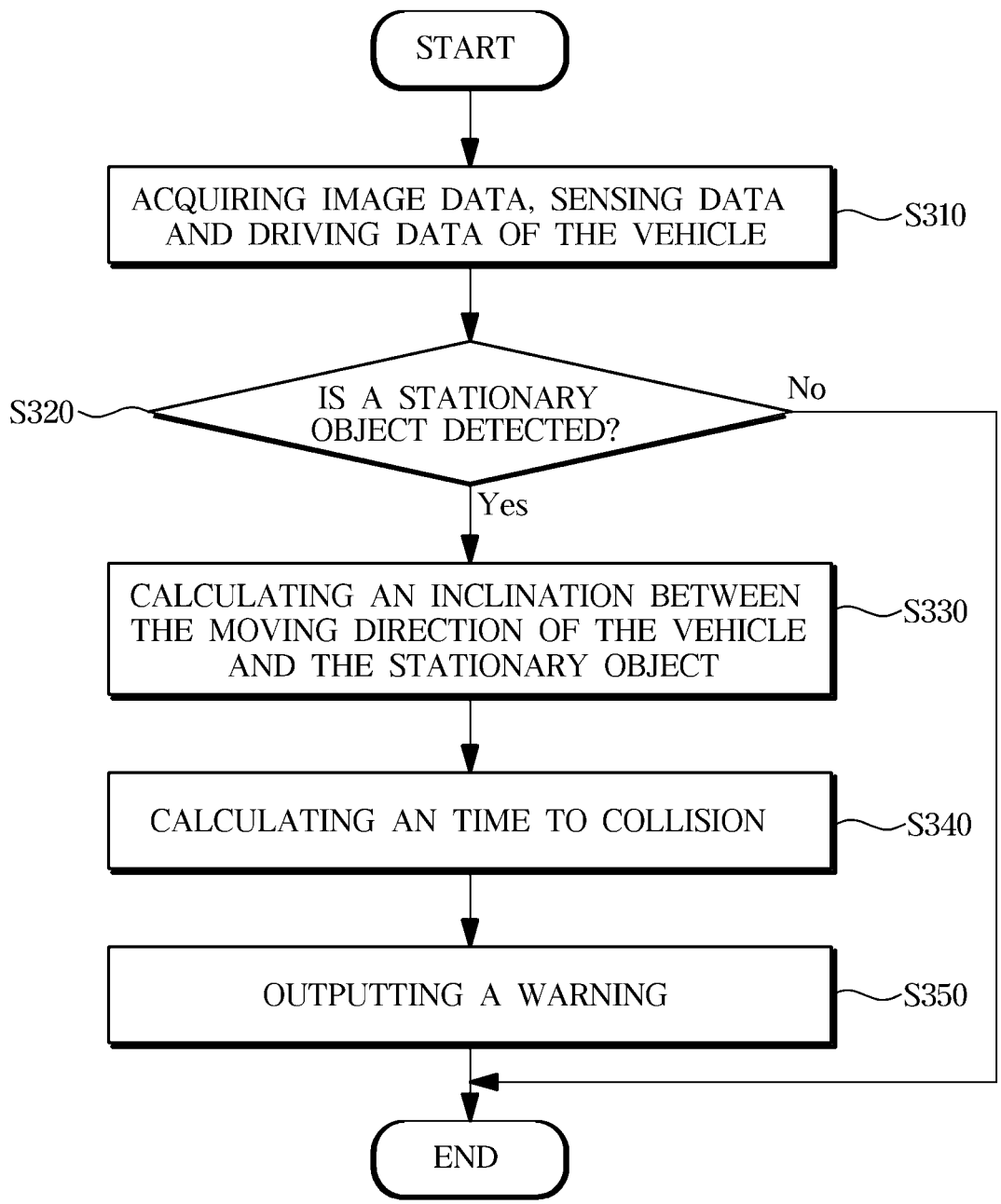

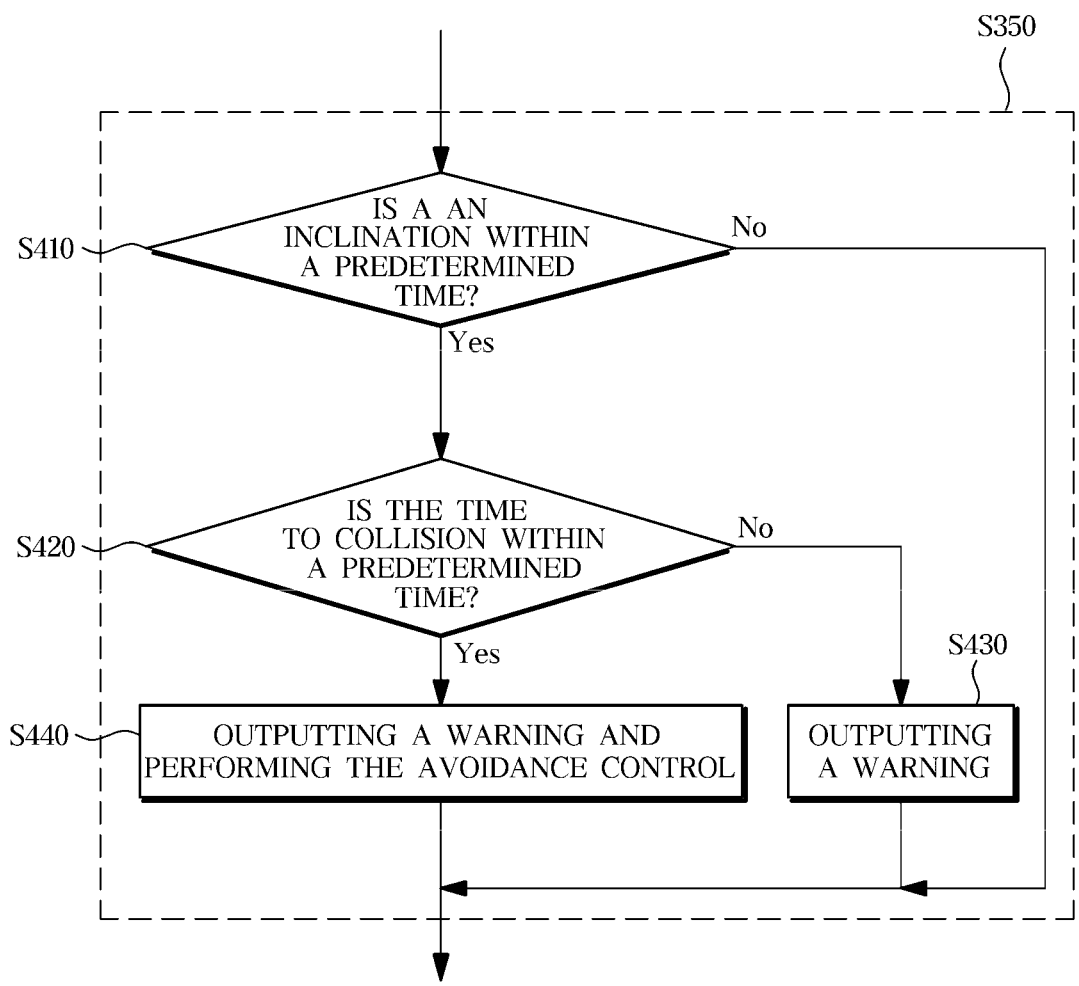

APPARATUS, SYSTEM AND METHOD FOR PREVENTING COLLISION

CROSS-REFERENCE TO RELATED APPLICATION

This application is based on and claims priority under 35 U.S.C. § 119 to Korean Patent Application No. 2019-0010636, filed on Jan. 28, 2019 in the Korean Intellectual Property Office, the disclosure of which is incorporated herein by reference.

BACKGROUND

1. Field

The present disclosure relates to a collision avoidance apparatus and a collision avoidance method, capable of detecting an object around a vehicle to prevent collision of the vehicle.

2. Description of the Related Art

The vehicle is a device for moving in the direction desired by the user on board. An example of a representative vehicle is a car. There is an increasing demand for active driving stability and accident prevention technology of vehicles, and according to this trend, driver assistance systems are provided in vehicles to assist drivers in various situations. For example, driver assistance systems are provided to perform the blind spot detection (BSD) or the lane change assist (LCA) functions for warning or control of other vehicles present in a predetermined area of the adjacent lane or rapidly approaching by mounting a radar on the rear left/right side of the vehicle.

However, if other vehicle close to the driver's vehicle tries to overtake the vehicle using the side lane behind a driving lane of the vehicle, the warning may not be performed because the other vehicle is not in the collision risk determination range despite the risk of a collision. In addition, the collision avoidance function may not work for stationary objects such as infrastructures of guardrails, tunnels or walls.

Therefore, even in such a situation, there is a need for a method for performing appropriate warning and control to a driver or performing for autonomous driving of a vehicle.

SUMMARY

In the above-described background, the present disclosure is directed to an apparatus, system, and method for preventing collision, configured to perform a driver assistance or autonomous driving by calculating a collision risk range and a time to collision using a velocity vector of a following vehicle located behind a vehicle in a driving lane in which the vehicle is driving, and by performing a warning and control to prevent a collision with an adjacent following vehicle.

In addition, the present disclosure is directed to an apparatus, system, and method for preventing collision, configured to perform driver assistance or autonomous driving, by calculating a time to collision based on the driving direction of the vehicle, the inclination between the stationary object and the relative velocity and distance of the stationary object and by performing a warning and control to prevent collision with the stationary object.

An embodiment for solving the above problems is provided a collision avoidance apparatus, comprising: a camera module configured to be disposed in the vehicle so as to have a view to the outside of the vehicle, configured to capture image data and configured to process the captured image data; at least one non-image sensor module configured to be disposed in the vehicle so as to have a sensing area with respect to the outside of the vehicle, configured to capture sensing data and configured to process the captured sensing data; a vehicle interior sensor module configured to detect a driving data of the vehicle; and a controller configured to prevent a collision with an object sensed around a vehicle, based at least in part on the processing of the image data and the sensing data; wherein the controller is operable to calculate a velocity vector of a following vehicle located behind the vehicle in the driving lane in which the vehicle is driving based on at least one of the image data and the sensing data, calculate a collision risk range between the vehicle with the following vehicle based on the driving data and the velocity vector, calculate a time to collision (TTC) within the collision risk range, and output a warning based on the time to collision.

In addition, an embodiment is provided a system for preventing a collision, comprising: a camera module configured to be disposed in the vehicle so as to have a view to the outside of the vehicle and configured to capture image data; at least one non-image sensor module configured to be disposed in the vehicle so as to have a sensing area with respect to the outside of the vehicle and configured to capture sensing data; a vehicle interior sensor module configured to detect a driving data of the vehicle; and a domain control unit configured to process image data and sensing data, prevent collisions with an object sensed around the vehicle, and control at least one driver assistance system module provided in the vehicle; wherein the domain control unit is operable to calculate a velocity vector of a following vehicle located behind the vehicle in a driving lane in which the vehicle is driving based at least in part on the processing of the image data and the sensing data, calculate a collision risk range between the vehicle with the following vehicle based on the driving data and the velocity vector, calculate a time to collision (TTC) within the collision risk range and to output a warning based on the time to collision.

In addition, an embodiment is provided a method for preventing a collision, comprising: acquiring image data and sensing data of the outside of a vehicle and driving data of the vehicle; calculating a velocity vector of a following vehicle located behind the vehicle in a driving lane in which the vehicle is driving, based on at least one of the image data and the sensing data; calculating a collision risk range between the vehicle and the following vehicle based on the driving data and the velocity vector; calculating a time to collision (TTC) within the collision risk range; and outputting a warning based on the time to collision.

According to the present disclosure, there is an effect capable of performing appropriate driver assistance or autonomous driving, by calculating a collision risk range and a time to collision using a velocity vector of a following vehicle located behind a vehicle in a driving lane in which the vehicle is driving, and by performing a warning and control to prevent a collision with an adjacent following vehicle.

Furthermore, according to the present disclosure, there is an effect capable of performing appropriate driver assistance or autonomous driving, by calculating a time to collision based on the driving direction of the vehicle, the inclination between the stationary object and the relative velocity and distance of the stationary object and by performing a warning and control to prevent collision with the stationary object.

BRIEF DESCRIPTION OF THE DRAWINGS

These and/or other aspects of the invention will become apparent and more readily appreciated from the following description of the embodiments, taken in conjunction with the accompanying drawings of which:

FIG. 9 is a flowchart illustrating a method for preventing a collision between a vehicle and a stationary object, according to an embodiment; and FIG. 10 is a flowchart illustrating a method for preventing a collision according to an inclination and a time to collision between a vehicle and a stationary object, according to an embodiment.

DETAILED DESCRIPTION

Some embodiments of the present disclosure are described in detail below with reference to exemplary drawings. In describing the components of the present disclosure, terms such as first, second, A, B, (a), and (b) may be used. These terms are only for distinguishing the components from other components, and the nature, order or sequence of the components are not limited by the terms. It will be understood that when an element is referred to as being "connected," or "coupled," to another element, it can be directly connected or coupled to the other element or intervening elements may be present.

The vehicle in the present specification may be a concept including an automobile, a motorcycle, and the like. In addition, the vehicle may be a concept including an internal combustion engine vehicle having an engine as a power source, a hybrid vehicle having an engine and an electric motor as a power source, and an electric vehicle having an electric motor as a power source. Hereinafter, a description will be given of a vehicle mainly for a vehicle.

In the following description, the front means a forward driving direction of the vehicle, and the rear means a backward driving direction of the vehicle. In addition, the left side of the vehicle means the left side of the forward driving direction of the vehicle, and the right side of the vehicle means the right side of the forward driving direction of the vehicle. In addition, the rear side of the vehicle means the left side or the right side based on the backward driving direction of the vehicle.

Hereinafter, a collision avoidance apparatus and a collision avoidance method according to embodiments of the present disclosure will be described with reference to related drawings.

Figure 1:
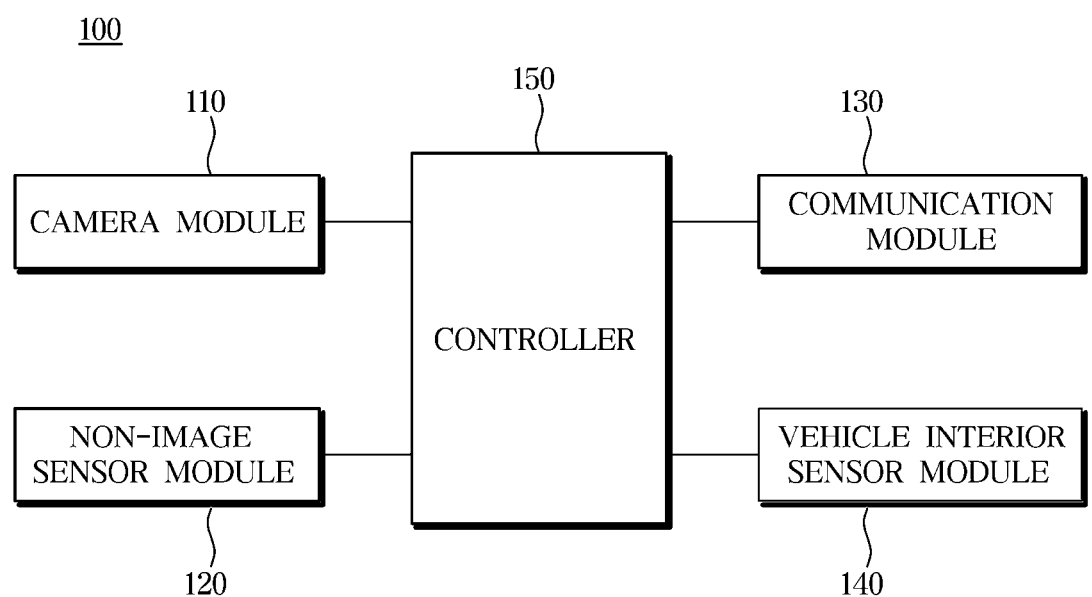
FIG. 1 is a block diagram of a collision avoidance apparatus provided in a vehicle according to an embodiment.

FIG. 1 is a block diagram of a collision avoidance apparatus 100 provided in a vehicle according to an embodiment.

Referring to FIG. 1, the collision avoidance apparatus 100 may be configured to include a camera module 110, a non-image sensor module 120, a communication module 130, a vehicle interior sensor module 140, a controller 150, and the like.

For example, the camera module 110 may include an image sensor configured to have a view of the inside or outside of the vehicle to capture image data, and a processor to process the captured image data.

For example, the image sensor may be disposed in the vehicle to have a view of the inside or the outside of the vehicle. At least one image sensor may be mounted to each part of the vehicle to have a view of the front, side or rear of the vehicle.

Since the image information captured by the image sensor is composed of image data, it may mean image data captured by the image sensor. Hereinafter, the image information captured from the image sensor in the present disclosure means image data captured from the image sensor. The image data captured by the image sensor may be generated, for example, in one of formats of AVI in raw form, MPEG-4, H.264, DivX, and JPEG.

The image data captured by the image sensor may be processed in the processor. The processor may be operable to process image data captured by the image sensor.

The processor may be implemented using at least one of an electrical unit capable of processing the image data and performing other functions, such as application specific integrated circuits (ASICs), digital signal processors (DSPs), digital signal processing devices (DSPDs), programmable logic devices (PLDs), field programmable gate arrays (FPGAs), controllers, microcontrollers, microprocessors, etc.

Meanwhile, the non-image sensor module 120 refers to other sensor modules except for the camera module 110 which captures an image. For example, the plurality of non-image sensor modules 120 may be disposed in the vehicle to have a sensing area for the inside or outside of the vehicle to capture sensing data. Examples of the plurality of non-image sensor modules 120 include a radar sensor, a lidar sensor, an ultrasonic sensor, and the like. The non-image sensor module 120 may not be provided or may be provided with one or more.

The communication module 130 performs a function for performing a vehicle and a vehicle, a vehicle and an infrastructure, a vehicle and a server, and in-vehicle communication. To this end, the communication module 130 may be composed of a transmitting module and a receiving module. For example, the communication module 130 may include a broadcast receiving module, a wireless internet module, a short range communication module, a location information module, an optical communication module, a V2X communication module, and the like.

The broadcast receiving module receives a broadcast signal or broadcast related information from an external broadcast management server through a broadcast channel.

Here, the broadcast includes at least one of radio broadcast and TV broadcast. The wireless internet module refers to a module for wireless internet access and may be built in or external to a vehicle.

The short range communication module is for Short range communication, and may support short range communication using at least one of Bluetooth™, Radio Frequency Identification (RFID), Infrared Data Association (IrDA), Ultra Wideband (UWB), ZigBee, and Near Field Communication (NFC), Wireless-Fidelity (Wi-Fi), Wi-Fi Direct, and Wireless Universal Serial Bus (Wireless USB) technologies.

The location information module is a module for obtaining location information of a vehicle, and a representative example thereof is a Global Positioning System (GPS) module. For example, when the vehicle utilizes a GPS module, the vehicle may acquire the position of the vehicle using a signal transmitted from a GPS satellite. In some embodiments, the location information module may be a component included in the vehicle interior sensor module 140 and not a component included in the communication module 130.

Meanwhile, according to an embodiment, the location information module may be a component included in the vehicle interior sensor module 140, not a component included in the communication module 130.

The optical communication module may include an optical transmitter and an optical receiver. The optical transmitter and the optical receiver may convert light signals into electrical signals to transmit and receive information.

The V2X communication module is a module for performing wireless communication with a server or another vehicle, an infrastructure device, or the like. In the present embodiment, the V2X communication module means that a vehicle exchanges information with another vehicle, a mobile device, a road, or the like through a wired/wireless network or a technology thereof.

The V2X communication modules include concepts such as Vehicle to Vehicle (V2V), Vehicle to Infrastructure (V2I), Vehicle to Nomadic Device (V2N), Vehicle to Pedestrian (V2P), and the like. The V2X communication module is based on dedicated short-range communications (DSRC), and may use the IEEE 802.11p communication technology using the WAVE or the 5.9 GHz band recently performed by the IEEE, but is not limited thereto, and it should be understood that the V2X communication module includes all inter-vehicle communications that will be developed now or in the future.

The vehicle interior sensor module 140 refers to a sensor for sensing vehicle interior information. For example, the vehicle interior sensor module 140 may refer to a torque sensor for sensing a steering torque, a steering angle sensor for sensing a steering angle, a motor position sensor for sensing information on a steering motor, a vehicle velocity sensor, a vehicle motion detection sensor for sensing a movement of a vehicle and a vehicle attitude detection sensor. In addition, the vehicle interior sensor module 140 may refer to a sensor for sensing various data in the inside of the vehicle, and may be configured one or more sensors.

The controller 150 may acquire a data from at least one of the camera module 110, the non-image sensor module 120, the communication module 130, and the vehicle interior sensor module 140, and may control various operations of the vehicle based on the acquired data. Alternatively, the controller 150 may acquire an image data from the camera module 110 and process the image data. In addition, the controller 150 may receive a sensing data from the non-image sensor module 120 and process the sensing data.

Alternatively, the controller 150 may acquire a data from the vehicle interior sensor module 140 or the communication module 130 and process the data. For this processing, the controller 150 may include at least one processor.

In addition, the controller 150 may control the operation of at least one of the camera module 110, the non-image sensor module 120, the communication module 130, and the vehicle interior sensor module 140. In addition, the controller 150 may control the operation of various driver assistance systems configured in the vehicle.

Meanwhile, when describing the non-image sensor module 120 used in the present disclosure in more detail, the radar sensor or the radar system may include at least one radar sensor unit, for example, one or more of a front sensing radar sensor mounted on the front of the vehicle, a rear radar sensor mounted at the rear of the vehicle and a side or side rear sensing radar sensor mounted at each side of the vehicle. Such a radar sensor or a radar system may analyze a transmitted signal and a received signal to process data, and accordingly, may detect an information about an object, and may include an electronic control unit (ECU) or a processor for this purpose. Data transmission or signal communication from the radar sensor to the ECU may use a communication link, such as an appropriate vehicle network bus.

Such a radar sensor includes at least one transmitting antenna for transmitting a radar signal and at least one receiving antenna for receiving a reflected signal reflected from an object.

Meanwhile, the radar sensor according to the present embodiment may adopt a signal transmission/reception scheme of a multi-dimensional antenna array and multiple input multiple outputs to form a virtual antenna aperture larger than an actual antenna aperture.

For example, two-dimensional antenna arrays are used to achieve horizontal and vertical angle precision and resolution. With a two-dimensional radar antenna array, signals are transmitted and received separately by two scans (time multiplexed) horizontally and vertically, and MIMO can be used separately from two-dimensional radar horizontal and vertical scans (time multiplexed).

More specifically, the radar sensor according to the present embodiment may be adopted a two-dimensional antenna array configuration including a transmitting antenna unit including a total of 12 transmitting antennas (Tx) and a receiving antenna unit including 16 receiving antennas (Rx), and as a result, may have a total of 192 virtual receiving antenna arrangements.

In this case, the transmitting antenna unit includes three transmitting antenna groups including four transmitting antennas, wherein the first transmitting antenna group may be spaced apart from the second transmitting antenna group a predetermined distance in a vertical direction, and the first or second transmitting antenna group may be spaced apart from the third transmitting antenna group by a predetermined distance (D) in a horizontal direction.

In addition, the receiving antenna unit may include four receiving antenna groups including four receiving antennas, each receiving antenna group is arranged to be spaced apart in the vertical direction, the receiving antenna unit may be disposed between the first transmitting antenna group and the third transmitting antenna group spaced in the horizontal direction.

Further, in another embodiment, the antennas of the radar sensor are arranged in a two-dimensional antenna array, for example, each antenna patch can have a Rhombus lattice arrangement to reduce unnecessary side lobes.

Alternatively, the two-dimensional antenna array may include a V-shape antenna array in which a plurality of radiating patches are arranged in a V-shape, and more specifically, may include two V-shape antenna arrays. At this time, a single feed is made to the Apex of each V-shaped antenna array.

Otherwise, the two-dimensional antenna array may include an X-shape antenna array in which a plurality of radiation patches are arranged in an X shape, and more specifically, may include two X-shaped antenna arrays. At this time, a single feed is made to the center of each X-shaped antenna array.

In addition, the radar sensor according to the present embodiment may use a MIMO antenna system in order to implement sensing accuracy or resolution in the vertical and horizontal directions.

More specifically, in the MIMO system, each transmitting antenna may transmit a signal having independent waveforms that are distinct from each other. That is, each transmitting antenna transmits an independent waveform signal that is distinct from other transmitting antennas, and each receiving antenna may determine from which transmitting antenna the reflected signal reflected from the object due to the different waveforms of these signals.

In addition, the radar sensor according to the present embodiment may be configured to include a radar housing for receiving a substrate and a circuit including a transmitting and receiving antenna, and a radome constituting the appearance of the radar housing. At this time, the radome is made of a material that can reduce the attenuation of the radar signal transmitted and received, and the radome may consist of the front and rear bumpers, grilles, or lateral body of the vehicle or the outside surfaces of the vehicle components.

That is, the radome of the radar sensor may be disposed inside the vehicle grille, the bumper, the vehicle body, or the like, and is disposed as a part of the parts constituting the outside surface of the vehicle such as the vehicle grille, the bumper, the vehicle body part, thereby providing a convenience of mounting the radar sensor while improving the vehicle aesthetics The lidar may include a laser transmitter, a receiver, and a processor. The lidar may be implemented in a time of flight (TOF) method or a phase-shift method.

The lidar of the TOF system emits a laser pulse signal and receives a reflected pulse signal reflected by the object. The lidar may measure the distance to the object based on the time when the laser pulse signal is emitted and the reflected pulse signal is received. In addition, the relative velocity with the object can be measured based on the change in distance over time.

The lidar of the phase-shift method may emit a laser beam that is continuously modulated at a specific frequency, and may measure time and distance from the object based on the amount of phase change of the signal reflected back to the object.

The lidar may detect the object based on the transmitted laser, and detect the distance and relative velocity with the detected object. If the object is a stationary object (for example, a street tree, a street light, a traffic light, a traffic sign, etc.), the lidar may detect the traveling velocity of the vehicle based on a time of flight (TOF) by the object.

The ultrasonic sensor may include an ultrasonic transmitter, a receiver, and a processor.

The ultrasonic sensor may detect an object based on the transmitted ultrasonic waves, and detect a distance and a relative velocity with the detected object. If the object is a stationary object (for example, a street tree, a street light, a traffic light, a traffic sign, etc.), the ultrasonic sensor may detect the traveling velocity of the vehicle based on a time of flight (TOF) by the object.

Figure 2:
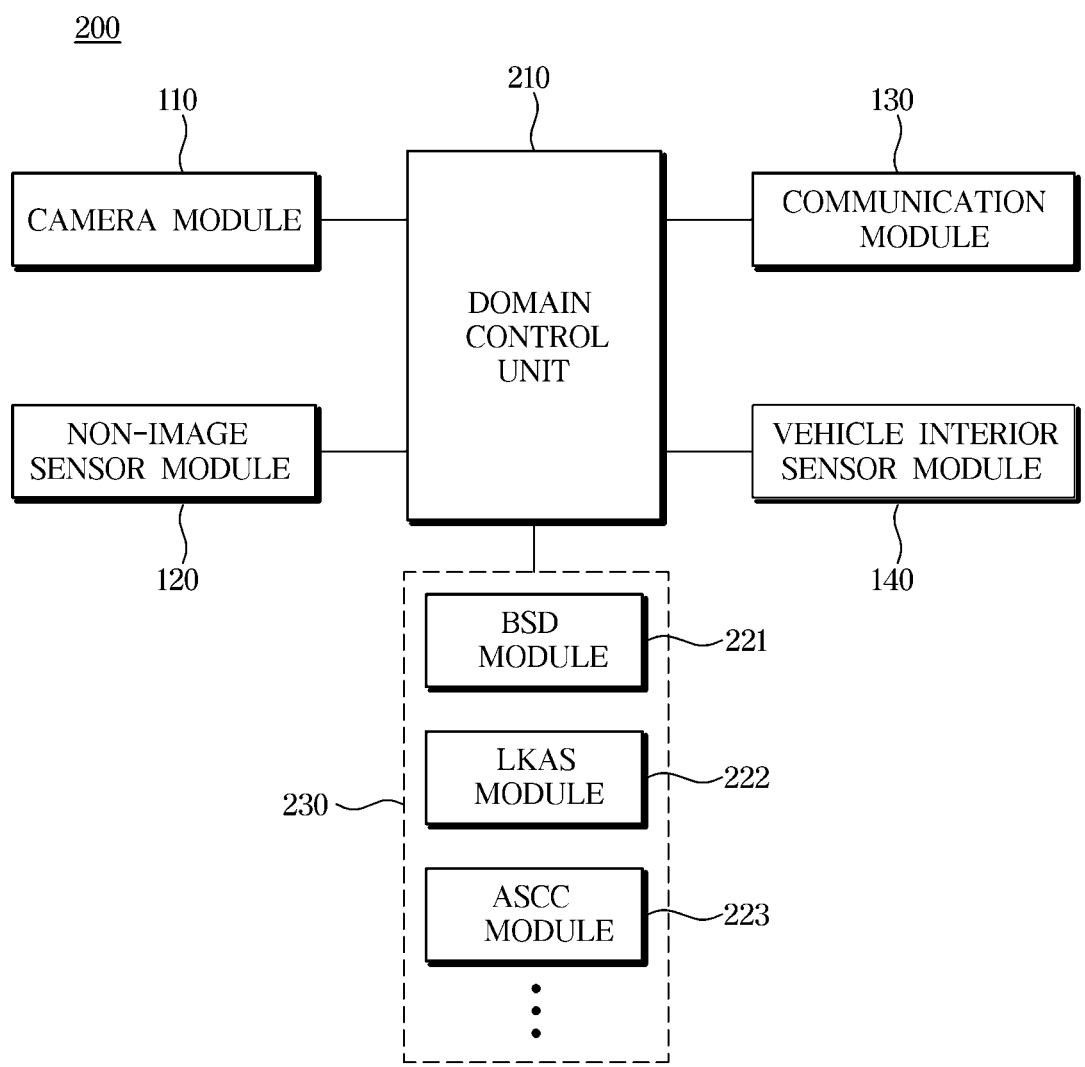
FIG. 2 is a block diagram of a collision avoidance system provided in a vehicle according to another embodiment.

FIG. 2 is a block diagram of a system for preventing a collision provided in a vehicle according to another embodiment.

Referring to FIG. 2, the collision avoidance system 200 may be configured to include at least one of the aforementioned camera module 110, the non-image sensor module 120, the communication module 130, and the vehicle interior sensor module 140. Description thereof has been described with reference to FIG. 1 and thus will be omitted.

In addition, the collision avoidance system 200 may include a domain control unit 210.

The domain control unit (DCU) 210 is configured to receive image data captured from at least one image sensor and receive sensing data captured from a plurality of non-image sensors, thereby processing at least one of the image data and the sensing data. For this processing, the domain control unit 210 may include at least one processor.

Alternatively, the domain control unit 210 may include may transmit/receive data with at least one module of the camera module 110, the non-image sensor module 120, the communication module 130, the vehicle interior sensor module 140, and the driver assistance system module 220. That is, the domain control unit 210 may be provided in a vehicle and communicate with at least one module mounted in the vehicle. To this end, the domain control unit 210 may further include a suitable data link or communication link, such as a vehicle network bus for data transmission or signal communication.

The domain control unit 210 may be operable to control one or more of the various driver assistance systems (DAS) used in the vehicle. For example, the domain control unit 210 may determine a specific situation, condition, event occurrence, control operation, etc. based on data acquired from at least one of the above-described modules 110, 120, 130, 140, and 220.

The domain control unit 210 may transmit a signal for controlling the operation of various driver assistance system modules 220 configured in the vehicle by using the determined information. For example, the driver assistance system module 220 may include a blind spot detection (BSD) system module 221, a lane keeping assistance system (LKAS) module 222, an adaptive smart cruise control (ASCO) system module 223, and the like. In addition, the driver assistance system module 220 configured in the vehicle may exist in various ways, such as a lane departure warning system (LDWS), a lane change assistance system (LCAS), a parking assistance system (PAS), and the like. The terms and names of the driver assistance system described herein are disclosed by way of example and not limited to.

In addition, the driver assistance system module 220 may include an autonomous driving module for autonomous driving. Alternatively, the domain control unit may control the vehicle to perform autonomous driving through control of individual system modules included in the driver assistance system module 220.

Figure 3:
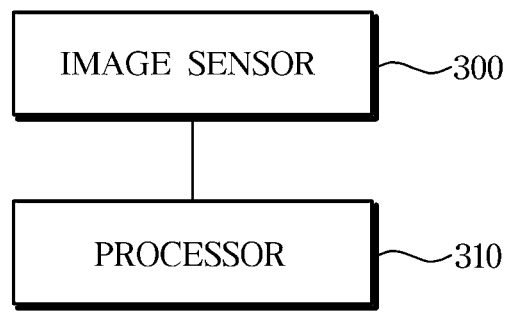
FIG. 3 is a block diagram for illustrating a camera module configured in a vehicle.

FIG. 3 is a block diagram for illustrating a camera module configured in a vehicle.

Referring to FIG. 3, the camera module 110 may include an image sensor 300 and a processor 310.

The image sensor 300 may refer to a device for converting light (image information) input through a camera lens into an electrical digital signal. For example, the image sensor 300 may refer to a charge coupled device (CCD) image sensor that directly transmits the signal of an electronic form. Alternatively, the image sensor 300 may refer to a complementary metal oxide semiconductor (CMOS) image sensor that converts a signal into a voltage form and transmits the signal.

As described above, the image sensor 300 may be disposed in the vehicle to have a view to the exterior or interior of the vehicle, and the at least one image sensor 300 may be mounted on each part of the vehicle to have a view of the front, the side, or the rear of the vehicle.

The image data captured by the image sensor 300 may be generated, for example, in one of formats of AVI in raw form, MPEG-4, H.264, DivX, and JPEG. The image data captured by the image sensor 300 may be processed by the processor 310.

The processor 310 may operate to process image data captured by the image sensor 300. As an example, the operation of processing of the image data may be processed by a processor included in the camera module. As another example, the image data may be processed by the controller 150 or the domain control unit 210 described above.

For example, the processor 310 may process the data read by the image sensor 300 into a high quality image through various calculations. If necessary, the processor 310 may process image data to perform operations such as target detection, distance measurement, and target classification.

The terms for each configuration described above and the examples for each configuration are for the convenience of understanding and are not limited to the terms and examples. In the following, in order to more clearly describe the embodiment according to the present disclosure, the above described terms may be modified and described. In addition, the configuration of the vehicle described with reference to FIGS. 1 to 3 has been described by way of example, and in the following, the configuration may be modified, added, or omitted in order to more clearly describe the present technical idea.

Figure 4:
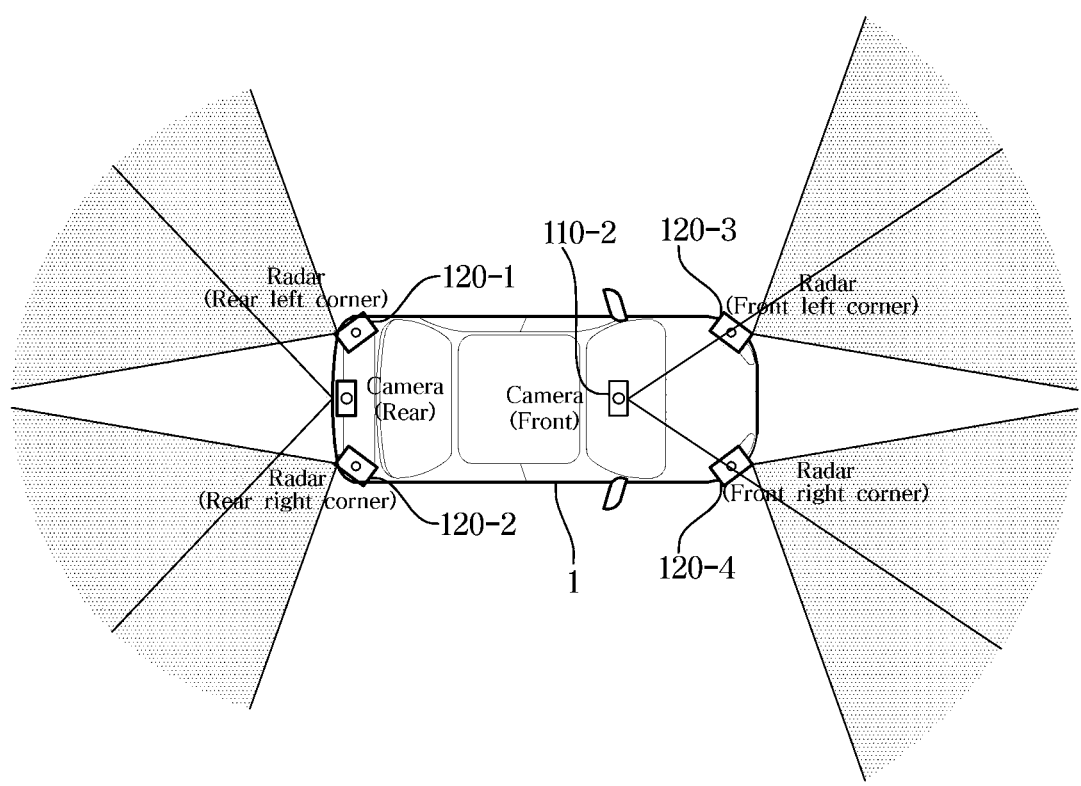
FIG. 4 is a diagram illustrating a camera module and a radar module provided in a vehicle, according to an embodiment.
Figure 5:
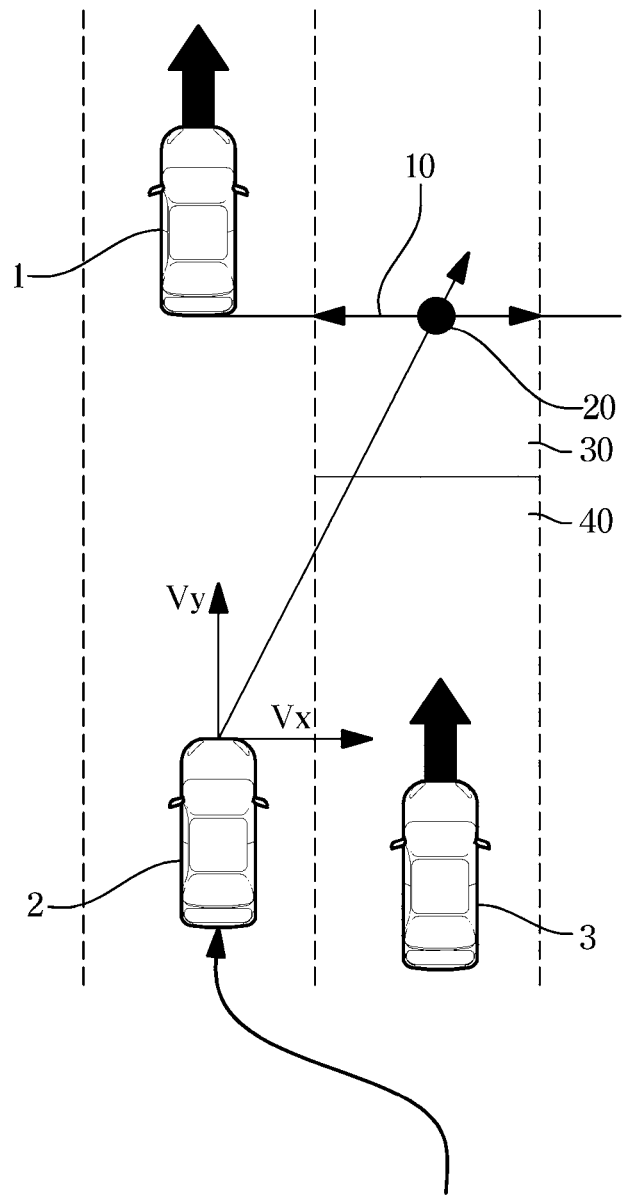
FIG. 5 is a diagram illustrating preventing a collision with a following vehicle that is close to a vehicle, according to an embodiment.

FIG. 4 is a diagram illustrating a camera module and a radar module provided in a vehicle, according to an embodiment, and FIG. 5 is a diagram illustrating preventing a collision with a following vehicle that is close to a vehicle, according to an embodiment.

a collision avoidance apparatus according to an embodiment of the present disclosure may include a camera module 110 configured to be disposed in the vehicle so as to have a view to the outside of the vehicle, configured to capture image data, and configured to process the captured image data; at least one non-image sensor module 120 configured to be disposed in the vehicle so as to have a sensing area with respect to the outside of the vehicle, configured to capture sensing data and configured to process the captured sensing data; a vehicle interior sensor module 140 configured to detect a driving data of the vehicle; and a controller 150 configured to prevent a collision with an object sensed around a vehicle, based at least in part on the processing of the image data and the sensing data As shown in FIG. 4, the camera module 110 may include a rear camera 110_1 configured to be disposed at the rear of the vehicle 1 to capture a rear image, and a front camera 110_2 configured to be disposed at the front of the vehicle 1 to capture a front image. The camera module 110 may include an image sensor and a processor for processing image data. Since the camera module 110 has been described above with reference to FIGS. 1 to 3, a detailed description thereof will be omitted.

As shown in FIG. 4, the non-image sensor module 120 may include a rear left radar module 120_1 disposed at a left corner of the rear of the vehicle 1, a rear right radar module 120_2 disposed at a right corner of the rear of the vehicle 1, a front left radar module 120_3 disposed at the left corner of the front of the vehicle 1, and a front right radar module 120_4 disposed at the right corner of the front of the vehicle 1.

According to an example, FIG. 4 illustrates the radar modules as the non-image sensor module 120, but is not limited thereto. According to the present disclosure, if information about an object around the vehicle 1 can be sensed, a lidar module or an ultrasonic sensor module may be substantially applied in the same manner in addition to the radar module.

The vehicle interior sensor module 140 may detect a driving data of the vehicle 1. According to an example, the driving data may include vehicle velocity information, steering angle information, vehicle attitude information, yaw rate information, and the like of the vehicle 1. In addition, the driving data may include the direction indicating light information of the vehicle 1. To this end, the vehicle interior sensor module 140 may include one or more sensors provided in the vehicle 1.

The controller 150 may calculate a velocity vector of a following vehicle located behind the vehicle in a driving lane in which the vehicle is driving, based on at least one of the image data and the sensing data.

Referring to FIG. 5, it is shown that a following vehicle 2 is driving behind a driving lane in which the vehicle 1 drives. In addition, it is shown that the rear side vehicle 3 is driving behind the adjacent lane of the driving lane in which the vehicle 1 drives.

Conventionally, when the rear side vehicle 3 exists in the proximal area 30 based on the adjacent lane of the driving lane in which the vehicle 1 is driving, a driver assistance system module such as BSD was performed a warning because there was a risk of collision in lane changes. Alternatively, even when the rear vehicle 3 approaches the predetermined area 40 farther than the proximal area 30 at a predetermined velocity or more, a warning has been performed.

However, as shown in FIG. 5, in the case of the following vehicle 2 that is driving in close proximity to the driving lane in which the vehicle 1 is driving, the following vehicle 2 does not exist in a sensing area of a conventional BSD, so that information on the following vehicle 2 is not sensed. When the following vehicle 2 attempts to overtake the vehicle 1 quickly by using the adjacent right lane, if the vehicle 1 also attempts to change lanes to the right lane, the warning for the following vehicle 2 may not be performed. In this case, the controller 150 is, of the following vehicle 2. The velocity vector may calculate the velocity vector of the following vehicle 2 based on at least one of the image data acquired from the camera module 110 and the sensing data acquired from the radar module, which is the non-image sensor module 120.

According to an example, the calculation of the velocity vector of the following vehicle 2 may be performed when the following vehicle 2 is close to within a predetermined distance from the rear of the vehicle 1.

Since when the following vehicle 2 attempts to overtake an adjacent lane in a state in which the following vehicle 2 is farther away from the vehicle 1 than the predetermined distance, the following vehicle 2 may be detected in the sensing areas 30 and 40 of the BSD provided in the vehicle, thereby no warning and control by the present disclosure is required.

According to an example, the predetermined distance may be variously set based on the velocity of the following vehicle 2, the driving tendency of the driver of the vehicle 1, and the like. For example, the faster the velocity of the following vehicle 2, the longer the predetermined distance can be set. In addition, For example, the predetermined time may be set longer as the driver of the vehicle 1 has a tendency to frequently change lanes. In this case, a configuration for learning the identification and driving tendency of the driver may be further included in the collision avoidance apparatus 100.

The controller 150 may calculate the velocity vector that is the sum of the velocity vector Vy for the driving direction parallel to the driving lane of the following vehicle 2 and the velocity vector Vx for the direction perpendicular to the driving direction, by using at least one of the image data and the radar sensing data.

According to an example, a velocity vector may be calculated using a change in size or position of the following vehicle 2 sequentially sensed in the image data or radar sensing data. However, this is only an example, and the present invention is not limited thereto, and the present invention is not limited to the specific method as long as the velocity vector can be calculated.

The controller 150 may calculate a collision risk range 10 between the vehicle 1 and the following vehicle 2 based on the driving data and the velocity vector. According to an example, the controller 150 may calculate the collision risk range 10 when the size of Vx among the velocity vector components of the following vehicle 2 becomes larger than a predetermined value. That is, when the following vehicle 2 only goes straight behind the vehicle 1, the magnitude of Vx is calculated to be near zero. In this case, the following vehicle 2 is not willing to overtake, the calculation of the collision risk range between the vehicle 1 and the following vehicle (2) in the subsequent operation may not be performed.

When the following vehicle 2 attempts to overtake, the magnitude of the velocity vector Vx increases, and when the velocity vector Vx becomes larger than a predetermined value, the controller 150 may calculate the collision risk range 10. The collision risk range 10 is a range in which there is a risk of collision with the following vehicle 2 when the vehicle 1 attempts to change lanes, and may include a cross point 20.

The controller 150 may calculate a collision risk range 10 and cross point 20 for a case where the vehicle 1 attempts to change lanes based on driving data including vehicle velocity information of the vehicle 1 and a velocity vector of the following vehicle 2. The controller 150 may predict a moving path in which the following vehicle 2 moves to the left or the right of the vehicle 1.

According to an example, the collision risk range 10 may be calculated based on the predicted movement path according to the velocity vector of the following vehicle 2. That is, considering the movement of the vehicle 1 while proceeding to the predicted movement path of the following vehicle 2, a straight line parallel to the rear surface of the vehicle 1 in the adjacent lane may be calculated as the collision risk range 10. The intersection of the collision risk range 10 and the predicted movement path may be obtained as the cross point 20. The controller 150 may calculate a time to collision (TTC) at the cross point 20.

The controller 150 may output a warning to the driver based on the calculated time to collision. According to an example, the controller 150 may display a warning about a rear collision in an area of the side mirror in a direction in which the following vehicle 2 attempts to overtake. Alternatively, the controller 150 may display a warning on a human machine interface (HMI) or a head up display (HUD). Alternatively, the controller 150 may output acoustically or tactually a warning through the sound output module or the haptic module provided in the vehicle 1.

According to an example, the controller 150 may be set to output a warning when the time to collision is determined to be within a predetermined time.

If the predetermined time is set too long, the output of the warning may be performed for a long time to give the driver fatigue and if the predetermined time is set too short, collision prevention may not be effectively performed when the driver attempts to change lanes, and thus based on this point, a predetermined time can be set.

According to an example, the predetermined time may be set according to the driving tendency of the driver of the vehicle 1. For example, the predetermined time may be set longer as the driver of the vehicle 1 has a tendency to frequently change lanes. In this case, a configuration for learning the identification and driving tendency of the driver may be further included in the collision avoidance apparatus 100.

The controller 150 may prevent lane departure by controlling at least one of a steering device and a braking device of the vehicle 1 when the lane change attempt of the vehicle 1 is detected in the collision risk range 10.

While performing the warning because the time to collision for the following vehicle 2 is within a predetermined time, the controller 150 may detect whether there is a lane change attempt.

According to an example, the controller 150 may detect a lane change attempt of the vehicle 1 in the collision risk range 10 by using lane information detected according to at least one of the image data and the sensing data.

The controller 150 may detect the lane change attempt by determining that the vehicle 1 moves in the lane direction detected from the image data and the sensing data. However, this is an example, but is not limited thereto.

According to another example, the controller 150 may determine that there is a lane change attempt when the direction indicating light in the adjacent lane direction is turned on. Alternatively, the controller 150 may determine whether there is a lane change attempt based on the steering angle or yaw rate information of the vehicle 1.

When the lane change attempt to the collision risk range 10 is detected, the controller 150 may control the steering apparatus of the vehicle 1 so that the vehicle 1 proceeds to the driving lane. Alternatively, when the vehicle 1 proceeds to the collision risk range 10, the controller 150 may control the braking device of the vehicle 1 to prevent the vehicle 1 from being separated from the driving lane due to side braking. To this end, according to an example, the controller 150 may transmit a control signal to an electronic control device provided in each of the steering device and the braking device of the vehicle 1.

In the above, it has been described that the warning and the control of the vehicle are performed under the assumption that the driver directly drives the vehicle, but is not limited thereto. The foregoing is applicable substantially the same even when the vehicle performs autonomous driving. The autonomous vehicle may also calculate a velocity vector for the following vehicle and control not to attempt a lane change according to the time to collision.

According to this, appropriate driver assistance or autonomous driving can be performed by calculating a collision risk range and a time to collision using a velocity vector of a following vehicle located behind a vehicle in a driving lane in which the vehicle is driving, and by performing a warning and control to prevent a collision with an adjacent following vehicle.

Figure 6:
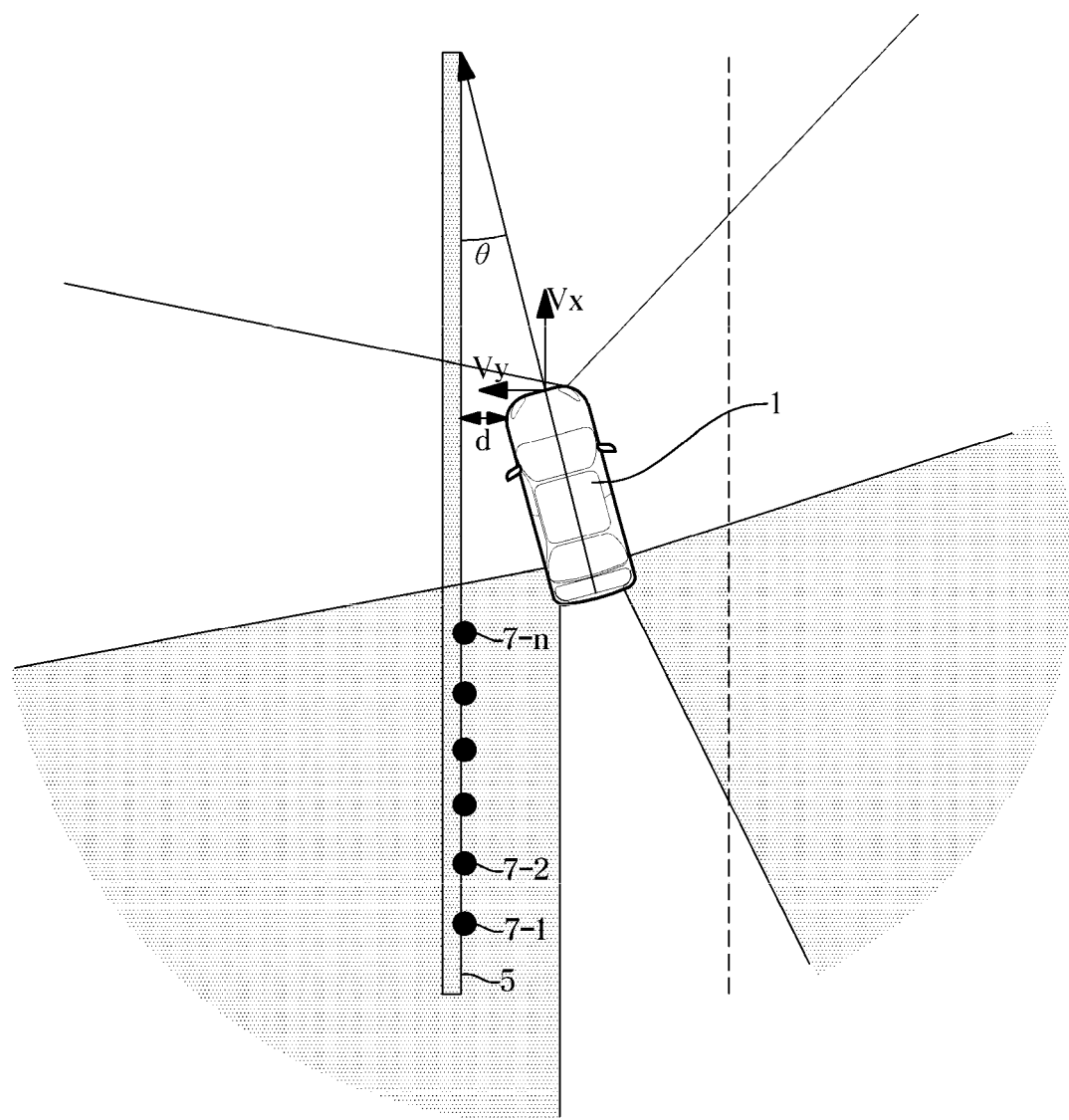
FIG. 6 is a diagram illustrating preventing a collision between a vehicle and a stationary object, according to an embodiment.

FIG. 6 is a diagram illustrating preventing a collision between a vehicle and a stationary object, according to an embodiment.

The controller 150 may detect a stationary object on the left or right side of the vehicle 1 based on the image data and the sensing data. Referring to FIG. 6, there is shown a case where the vehicle 1 is in danger of colliding with the guardrail 5, which is an infrastructure, as a stationary object existing on the left side due to inadvertent drowsiness of the driver. The infrastructure may include, in addition to the guard rail, various structures that may collide while driving the vehicle, such as tunnel walls or a median. Although FIG. 6 describes the case where the infrastructure is on the left side of the vehicle 1, it should be understood that the case may be substantially equally applied to the case where the infrastructure is on the right side.

As shown in FIG. 6, the controller 150 may detect the target 7 from image data or radar sensing data. The target 7 may be detected at regular intervals. According to an example, since the guard rail 5 installed around the road have similar shapes to each other and are linearly installed at regular intervals, when the detected target 7 is detected to be linearly distributed within a certain distance, the controller 150 may determine the target as a stationary object such as a guard rail. However, this is merely one example, if the stationary object can be detected, but is not limited to a specific method.

The controller 150 may calculate an inclination between the driving direction of the vehicle 1 and the guard rail 5, which is a stationary object, based on the driving data. The controller 150 may calculate the velocity vector Vx parallel to the driving lane and the velocity vector Vy perpendicular to the driving lane, based on the vehicle velocity information, the steering angle information, the vehicle attitude information, the yaw rate information, and the like of the vehicle 1. In addition, the controller 150 may calculate the distance d between the front of the vehicle 1 and the guard rail 5 using the image data or the radar sensing data. The controller 150 may calculate the inclination 8 formed between the guard rail 5 and the driving direction of the vehicle 1 using the calculated information.

The controller 150 may output a warning when the calculated inclination is greater than or equal to a predetermined angle. If the predetermined angle is set too small, the output of the warning may be performed for a long time to give the driver fatigue and if the predetermined angle is set too large, collision prevention due to carelessness of the driver cannot be effectively performed, and based on this point, the predetermined angle can be set.

According to an example, the controller 150 may display a warning about a collision in one region of the side mirror in the direction in which the guard rail 5 is located. Alternatively, the controller 150 may display a warning on the HMI or the HUD. Alternatively, the controller 150 may output acoustically or tactually a warning through the sound output module or the haptic module provided in the vehicle 1.

The controller 150 may calculate the relative velocity and distance between the stationary object and the vehicle using the image data, the radar sensing data, and the driving data. The relative velocity of the guard rail 5 which is the stationary object relative to the vehicle 1 is represented by a negative value equal to the velocity of the vehicle 1. That is, when the sum of the relative velocity and the velocity of the vehicle 1 is very close to zero, only the vehicle 1 moves while the object in front is stationary, and therefore the object in front of the vehicle is recognized as a stationary object.

The controller 150 may calculate a time to collision of the vehicle 1 with respect to the guardrail 5, which is a stationary object, based on the calculated relative velocity and distance. When the time to collision is determined to be within a predetermined time, the controller 150 may control at least one of a steering device and a braking device of the vehicle 1 to perform the avoidance control. The controller 150 may control the steering device of the vehicle 1 so that the vehicle 1 proceeds along the driving lane. Alternatively, the controller 150 may perform side braking by controlling the braking device of the vehicle 1 to prevent a collision with the guard rail 5.

According to an example, the predetermined time may be set according to the driving tendency of the driver of the vehicle 1. For example, the predetermined time may be set longer as the driver of the vehicle 1 has a tendency to inadvertently drive inadvertently. In this case, a configuration for learning the identification and driving tendency of the driver may be further included in the collision avoidance apparatus 100.

In the above, it has been described that the warning and the control of the vehicle are performed under the assumption that the driver directly drives the vehicle, but is not limited thereto. The foregoing is applicable substantially the same even when the vehicle performs autonomous driving.

According to this, appropriate driver assistance or autonomous driving can be performed by calculating a time to collision based on the driving direction of the vehicle, the inclination between the stationary object and the relative velocity and distance of the stationary object and by performing a warning and control to prevent collision with the stationary object.

As described above in FIG. 2, a system for preventing a collision to an embodiment, comprising: a camera module 110 configured to be disposed in the vehicle so as to have a view to the outside of the vehicle and configured to capture image data; at least one non-image sensor module 120 configured to be disposed in the vehicle so as to have a sensing area with respect to the outside of the vehicle and configured to capture sensing data; a vehicle interior sensor module 140 configured to detect a driving data of the vehicle; and a domain control unit 210 configured to process image data and sensing data, prevent collisions with an object sensed around the vehicle, and control at least one driver assistance system module 220 provided in the vehicle.

The content related to the camera module 110, the non-image sensor module 120, and the vehicle interior sensor module 140 among the above-described collision avoidance apparatus 110, may be applied to the collision avoidance system 200 in substantially the same manner except for content that is not applicable, and detailed descriptions thereof will be omitted to avoid overlapping descriptions.

The domain control unit 210 is operable to calculate a velocity vector of a following vehicle located behind the vehicle in a driving lane in which the vehicle is driving based at least in part on the processing of the image data and the sensing data, calculate a collision risk range between the vehicle with the following vehicle based on the driving data and the velocity vector, calculate a time to collision (TTC) within the collision risk range and to output a warning based on the time to collision.

The domain control unit 210 may calculate a velocity vector of the following vehicle located behind the vehicle in the driving lane in which the vehicle is driving, based on at least one of the image data and the sensing data. Referring to FIG. 5, it is shown that the following vehicle 2 is driving behind a driving lane on which the vehicle 1 is driving.

When the following vehicle 2 attempts to quickly pass the vehicle 1 using the adjacent right lane, if the vehicle 1 also attempts to change lanes to the right lane, the warning for the following vehicle 2 may not be performed. In this case, the domain control unit 210 may calculate the velocity vector of the following vehicle 2 based on at least one of the image data acquired from the camera module 110 and the sensing data acquired from the radar module which is the non-image sensor module 120.

According to one example, the calculation of the velocity vector of the following vehicle 2 can be performed when the following vehicle 2 is within a predetermined distance from the rear of the vehicle 1. The predetermined distance may be variously set based on the velocity of the following vehicle 2, the driving tendency of the driver of the vehicle 1, and the like. For example, the faster the velocity of the following vehicle 2, the longer the predetermined distance can be set. In addition, For example, the predetermined time may be set longer as the driver of the vehicle 1 has a tendency to frequently change lanes. In this case, a configuration for learning the identification and driving tendency of the driver may be further included in the collision avoidance system 200.

The domain control unit 210 may calculate the velocity vector that is the sum of the velocity vector Vy for the driving direction parallel to the driving lane of the following vehicle 2 and the velocity vector Vx for the direction perpendicular to the driving direction, by using at least one of the image data and the radar sensing data. According to an example, a velocity vector may be calculated using a change in size or position of the following vehicle 2 sequentially sensed in the image data or radar sensing data. However, this is only an example, and the present invention is not limited thereto, and the present invention is not limited to the specific method as long as the velocity vector can be calculated.

The domain control unit 210 may calculate a collision risk range 10 between the vehicle 1 and the following vehicle 2 based on the driving data and the velocity vector. According to an example, the domain control unit 210 may calculate the collision risk range 10 when the size of Vx among the velocity vector components of the following vehicle 2 becomes larger than a predetermined value. That is, when the following vehicle 2 only goes straight behind the vehicle 1, the magnitude of Vx is calculated to be near zero. In this case, the following vehicle 2 is not willing to overtake, the calculation of the collision risk range between the vehicle 1 and the following vehicle 2 in the subsequent operation may not be performed.

When the following vehicle 2 attempts to overtake, the magnitude of the velocity vector Vx increases, and when the velocity vector Vx becomes larger than a predetermined value, the domain control unit 210 may calculate the collision risk range 10. The collision risk range 10 is a range in which there is a risk of collision with the following vehicle 2 when the vehicle 1 attempts to change lanes, and may include a cross point 20.

The domain control unit 210 may calculate a collision risk range 10 and cross point 20 for a case where the vehicle 1 attempts to change lanes based on driving data including vehicle velocity information of the vehicle 1 and a velocity vector of the following vehicle 2. The domain control unit 210 may predict a moving path in which the following vehicle 2 moves to the left or the right of the vehicle 1.

According to an example, the collision risk range 10 may be calculated based on the predicted movement path according to the velocity vector of the following vehicle 2. That is, considering the movement of the vehicle 1 while proceeding to the predicted movement path of the following vehicle 2, a straight line parallel to the rear surface of the vehicle 1 in the adjacent lane may be calculated as the collision risk range 10. The intersection of the collision risk range 10 and the predicted movement path may be obtained as the cross point 20. The domain control unit 210 may calculate a time to collision (TTC) at the cross point 20.

The domain control unit 210 may output a warning to the driver based on the calculated time to collision. According to an example, the domain control unit 210 may display a warning about a rear collision in an area of the side mirror in a direction in which the following vehicle 2 attempts to overtake. Alternatively, the domain control unit 210 may display a warning on a human machine interface (HMI) or a head up display (HUD). Alternatively, the domain control unit 210 may output acoustically or tactually a warning through the sound output module or the haptic module provided in the vehicle 1.

The domain control unit 210 may be set to output a warning when the time to collision is determined to be within a predetermined time. If the predetermined time is set too long, the output of the warning may be performed for a long time to give the driver fatigue and if the predetermined time is set too short, collision prevention may not be effectively performed when the driver attempts to change lanes, and thus based on this point, a predetermined time can be set.

According to an example, the predetermined time may be set according to the driving tendency of the driver of the vehicle 1. For example, the predetermined time may be set longer as the driver of the vehicle 1 has a tendency to frequently change lanes. In this case, a configuration for learning the identification and driving tendency of the driver may be further included in the collision avoidance system 200.

The domain control unit 210 may prevent lane departure by controlling at least one of a steering device and a braking device of the vehicle 1 when the lane change attempt of the vehicle 1 is detected in the collision risk range 10. While performing the warning because the time to collision for the following vehicle 2 is within a predetermined time, the domain control unit 210 may detect whether there is a lane change attempt.

According to an example, the domain control unit 210 may detect a lane change attempt of the vehicle 1 in the collision risk range 10 by using lane information detected according to at least one of the image data and the sensing data. The domain control unit 210 may detect the lane change attempt by determining that the vehicle 1 moves in the lane direction detected from the image data and the sensing data. However, this is an example, but is not limited thereto. According to another example, the domain control unit 210 may determine that there is a lane change attempt when the direction indicating light in the adjacent lane direction is turned on. Alternatively, the domain control unit 210 may determine whether there is a lane change attempt based on the steering angle or yaw rate information of the vehicle 1.

When the lane change attempt to the collision risk range 10 is detected, the domain control unit 210 may control the steering apparatus of the vehicle 1 so that the vehicle 1 proceeds to the driving lane. Alternatively, when the vehicle 1 proceeds to the collision risk range 10, the domain control unit 210 may control the braking device of the vehicle 1 to prevent the vehicle 1 from being separated from the driving lane due to side braking.

According to an example, when the vehicle 1 is provided with the collision avoidance system 200 including the domain control unit 210, the electronic control device may be omitted from the steering device and the braking device of the vehicle 1. In this case, the domain control unit 210 may directly control the steering device and the braking device.

In the above, it has been described that the warning and the control of the vehicle are performed under the assumption that the driver directly drives the vehicle, but is not limited thereto. The foregoing is applicable substantially the same even when the vehicle performs autonomous driving. The autonomous vehicle may also calculate a velocity vector for the following vehicle and control not to attempt a lane change according to the time to collision.

According to this, appropriate driver assistance or autonomous driving can be performed by calculating a time to collision based on the driving direction of the vehicle, the inclination between the stationary object and the relative velocity and distance of the stationary object and by performing a warning and control to prevent collision with the stationary object.

The domain control unit 210 may detect a stationary object on the left or right side of the vehicle 1 based on the image data and the sensing data. As described to FIG. 6, the domain control unit 210 may detect the target 7 from image data or radar sensing data. The target 7 may be detected at regular intervals. According to an example, since the guard rail 5 installed around the road have similar shapes to each other and are linearly installed at regular intervals, when the detected target 7 is detected to be linearly distributed within a certain distance, the domain control unit 210 may determine the target as a stationary object such as a guard rail. However, this is merely one example, if the stationary object can be detected, but is not limited to a specific method.

The domain control unit 210 may calculate an inclination between the driving direction of the vehicle 1 and the guard rail 5, which is a stationary object, based on the driving data. The domain control unit 210 may calculate the velocity vector Vx parallel to the driving lane and the velocity vector Vy perpendicular to the driving lane, based on the vehicle velocity information, the steering angle information, the vehicle attitude information, the yaw rate information, and the like of the vehicle 1. In addition, the domain control unit 210 may calculate the distance d between the front of the vehicle 1 and the guard rail 5 using the image data or the radar sensing data. The domain control unit 210 may calculate the inclination 8 formed between the guard rail 5 and the driving direction of the vehicle 1 using the calculated information.

The domain control unit 210 may output a warning when the calculated inclination is greater than or equal to a predetermined angle. If the predetermined angle is set too small, the output of a warning is frequently performed to give the driver fatigue, and if the predetermined angle is set too large, collision prevention due to carelessness of the driver cannot be effectively performed, and based on this point, the predetermined angle can be set.

According to an example, the domain control unit 210 may display a warning about a collision in one region of the side mirror in the direction in which the guard rail 5 is located. Alternatively, the controller 150 may display a warning on the HMI or the HUD. Alternatively, the controller 150 may output acoustically or tactually a warning through the sound output module or the haptic module provided in the vehicle 1.

The domain control unit 210 may calculate the relative velocity and distance between the stationary object and the vehicle using the image data, the radar sensing data, and the driving data. The relative velocity of the guard rail 5 which is the stationary object relative to the vehicle 1 is represented by a negative value equal to the velocity of the vehicle 1. That is, when the sum of the relative velocity and the velocity of the vehicle 1 is very close to zero, only the vehicle 1 moves while the object in front is stationary, and therefore the object in front of the vehicle is recognized as a stationary object.

The domain control unit 210 may calculate a time to collision of the vehicle 1 with respect to the guardrail 5, which is a stationary object, based on the calculated relative velocity and distance. When the time to collision is determined to be within a predetermined time, the domain control unit 210 may control at least one of a steering device and a braking device of the vehicle 1 to perform the avoidance control. The domain control unit 210 may control the steering device of the vehicle 1 so that the vehicle 1 proceeds along the driving lane. Alternatively, the domain control unit 210 may perform side braking by controlling the braking device of the vehicle 1 to prevent a collision with the guard rail 5.

According to an example, the predetermined time may be set according to the driving tendency of the driver of the vehicle 1. For example, the predetermined time may be set longer as the driver of the vehicle 1 has a tendency to inadvertently drive inadvertently. In this case, a configuration for learning the identification and driving tendency of the driver may be further included in the collision avoidance system 200.

In the above, it has been described that the warning and the control of the vehicle are performed under the assumption that the driver directly drives the vehicle, but is not limited thereto. The foregoing is applicable substantially the same even when the vehicle performs autonomous driving.

According to this, appropriate driver assistance or autonomous driving can be performed by calculating a time to collision based on the driving direction of the vehicle, the inclination between the stationary object and the relative velocity and distance of the stationary object and by performing a warning and control to prevent collision with the stationary object.

The collision avoidance method according to the present disclosure may be implemented in the collision avoidance apparatus described with reference to FIG. 1. Hereinafter, a collision avoidance method and an operation of the collision avoidance apparatus 100 for implementing the same will be described in detail with reference to the accompanying drawings. Hereinafter, although described with reference to the collision avoidance apparatus 100 including the controller 150, but is not limited thereto. The collision avoidance method may be substantially the same in the collision avoidance system 200 including the domain control unit 210.

Figure 7:
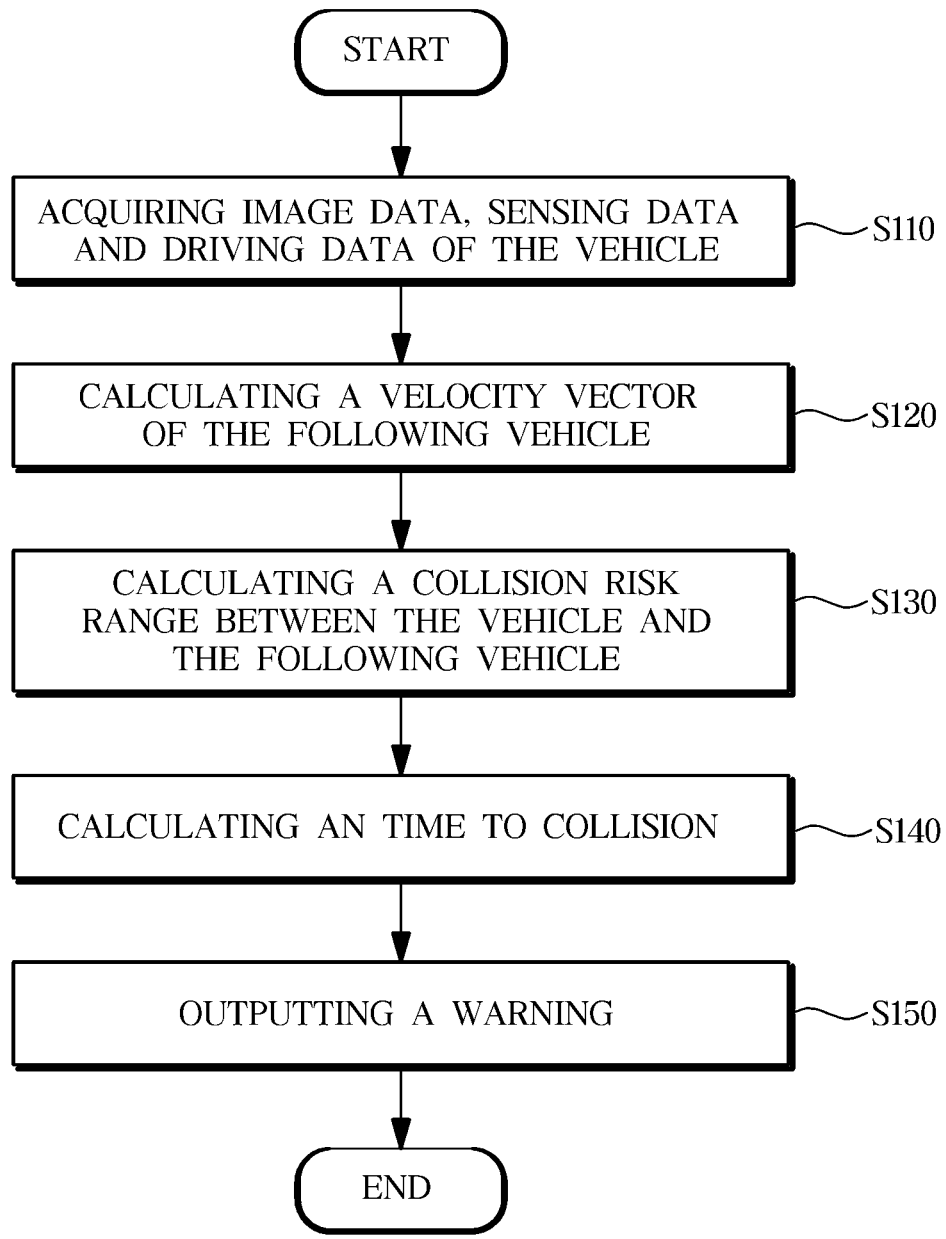
FIG. 7 is a flowchart of a method for preventing a collision between a vehicle and a following vehicle, according to an embodiment.
Figure 8:
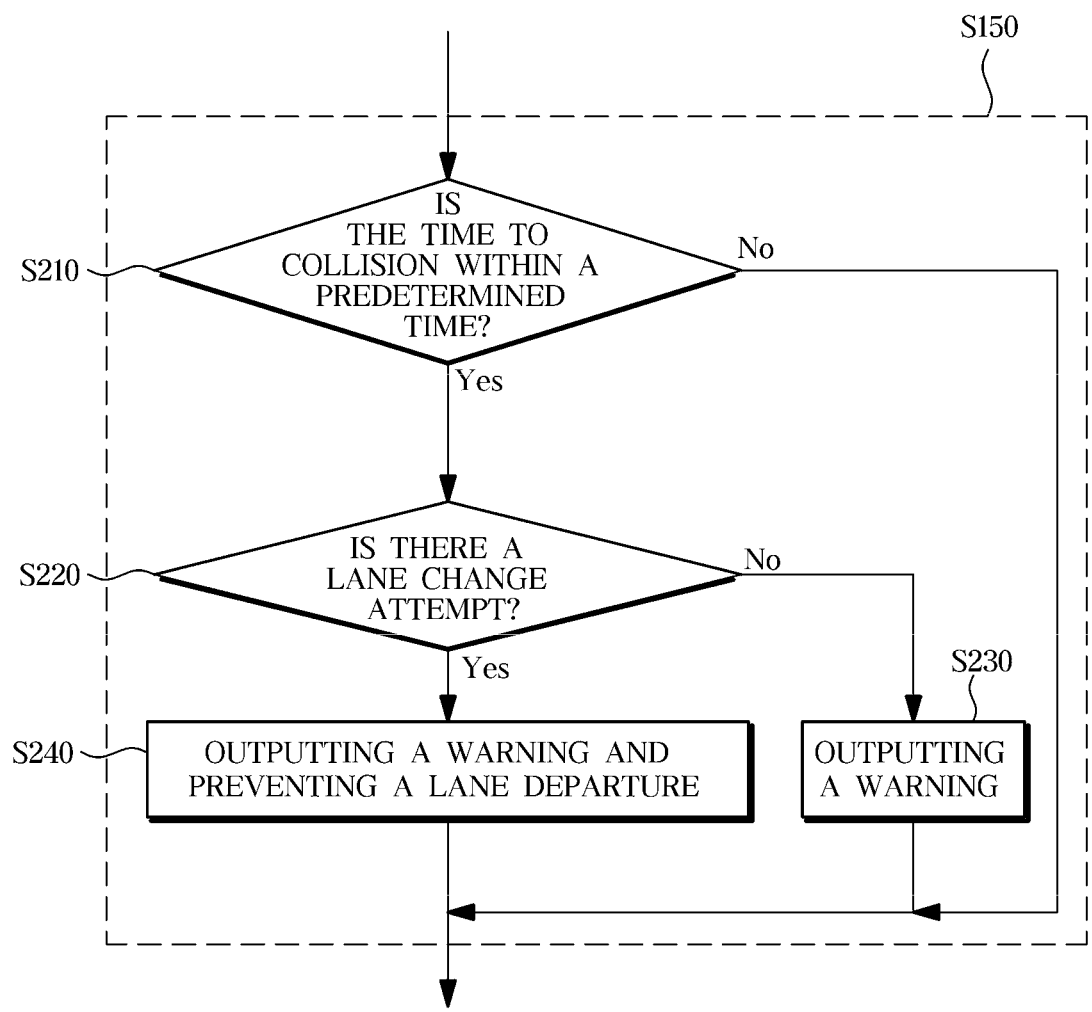
FIG. 8 is a flowchart illustrating a method for preventing a collision according to a time to collision and a lane change attempt between a vehicle and a following vehicle, according to an embodiment.

FIG. 7 is a flowchart of a method for preventing a collision between a vehicle and a following vehicle, according to an embodiment, and FIG. 8 is a flowchart illustrating a method for preventing a collision according to a time to collision and a lane change attempt between a vehicle and a following vehicle, according to an embodiment;

Referring to FIG. 7, the collision avoidance apparatus may acquire image data and sensing data about the outside of the vehicle and driving data of the vehicle [S110].

The collision avoidance apparatus may acquire rear image data and front image data of the vehicle through the camera module. In addition, the collision avoidance apparatus may acquire sensing data for the front and rear of the vehicle through a non-image sensor module such as a radar module. In addition, the collision avoidance apparatus may acquire vehicle velocity information, steering angle information, vehicle attitude information, yaw rate information, and the like, as driving data through the vehicle interior sensor module provided in the vehicle.

Referring back to FIG. 7, the collision avoidance apparatus may calculate a velocity vector of the following vehicle located behind the vehicle in the driving lane in which the vehicle is driving based on at least one of the image data and the sensing data [S120].

The controller of the collision avoidance apparatus may calculate a velocity vector of the following vehicle located behind the vehicle in the driving lane in which the vehicle is driving based on at least one of the image data and the sensing data.

When the following vehicle in close proximity to the driving lane in which the vehicle is driving, attempts to quickly pass the vehicle using the adjacent left or right lanes, if the vehicle also attempts to change lanes to the same lane, the warning for the following vehicle may not be performed. In this case, the controller may calculate the velocity vector of the following vehicle based on at least one of the image data and the sensing data.

The controller may calculate the velocity vector that is the sum of the velocity vector Vy for the driving direction parallel to the driving lane of the following vehicle and the velocity vector Vx for the direction perpendicular to the driving direction, by using at least one of the image data and the radar sensing data. According to an example, a velocity vector may be calculated using a change in size or position of the following vehicle sequentially sensed in the image data or radar sensing data. However, this is only an example, but is not limited thereto, and the present invention is not limited to the specific method as long as the velocity vector can be calculated.

Referring back to FIG. 7, the collision avoidance apparatus may calculate a collision risk range between the vehicle and the following vehicle based on the driving data and the velocity vector [S130].

The controller of the collision avoidance apparatus may calculate a collision risk range between the vehicle and the following vehicle based on the driving data and the velocity vector. According to an example, the controller may calculate the collision risk range when the magnitude of Vx among the velocity vector components of the following vehicle becomes larger than a predetermined value. That is, when the following vehicle only goes straight behind the vehicle, the magnitude of Vx is calculated to be near zero. In this case, the following vehicle is not willing to overtake, the calculation of the collision risk range between the vehicle and the following vehicle in the subsequent operation may not be performed.

When the following vehicle attempts to overtake, the magnitude of the velocity vector Vx increases, and when the velocity vector Vx becomes larger than a predetermined value, the controller may calculate the collision risk range. The collision risk range is a range in which there is a risk of collision with the following vehicle when the vehicle attempts to change lanes, and may include a cross point.

Referring back to FIG. 7, the collision avoidance apparatus may calculate an time to collision within a collision risk range [S140].

The controller of the collision avoidance apparatus may calculate the collision risk range based on the predicted movement path according to the velocity vector of the following vehicle. Considering the movement of the vehicle while proceeding to the predicted movement path of the following vehicle, a straight line parallel to the rear surface of the vehicle 1 in the adjacent lane may be calculated as the collision risk range. The intersection of the collision risk range and the predicted movement path may be obtained as the cross point. The controller may calculate a time to collision (TTC) at the cross point.

Referring back to FIG. 7, the collision avoidance apparatus may output a warning based on time to collision [S150].

The controller may display a warning about a rear collision in an area of the side mirror in a direction in which the following vehicle attempts to overtake. Alternatively, the controller may display a warning on a human machine interface (HMI) or a head up display (HUD). Alternatively, the controller may output acoustically or tactually a warning through the sound output module or the haptic module provided in the vehicle. Hereinafter, the warning output of the collision avoidance apparatus will be described in detail with reference to FIG. 8.

Referring to FIG. 8, the controller of the collision avoidance apparatus may determine whether the calculated time to collision is within a predetermined time [S210]. If the predetermined time is set too long, the output of the warning may be performed for a long time to give the driver fatigue and if the predetermined time is set too short, collision prevention may not be effectively performed when the driver attempts to change lanes, and thus based on this point, a predetermined time can be set.

According to an example, the predetermined time may be set according to the driving tendency of the driver of the vehicle. For example, the predetermined time may be set longer as the driver of the vehicle has a tendency to frequently change lanes. In this case, a configuration for learning the identification and driving tendency of the driver may be further included in the collision avoidance apparatus.

If the time to collision is not within a predetermined time (S210, No), the controller may restart the process shown in FIG. 7 from the beginning, without outputting a warning.

If it is determined that the time to collision is within a predetermined time (S210, Yes), the controller may determine whether a lane change attempt of the vehicle to the collision risk range is detected [S220]. According to an example, the controller may detect an attempt to change the lane of the vehicle to the collision risk range using the lane information sensed according to at least one of the image data and the sensing data. However, this is an example, but is not limited thereto.

According to another example, when the direction indicating light of the adjacent lane direction is turned on, the controller may determine that there is a lane change attempt. Alternatively, the controller may determine whether there is a lane change attempt based on the steering angle, yaw rate information, or the like of the vehicle.

If a lane change attempt is not detected (S220, No), the controller may output only a warning about a collision risk without controlling the steering or braking of the vehicle [S230].

If the lane change attempt is detected (S220, Yes), the controller may control at least one of the steering device and the braking device of the vehicle to prevent the lane departure [S240]. According to an example, the controller may control the steering apparatus of the vehicle so that the vehicle proceeds in the driving lane. Alternatively, when the vehicle proceeds to the collision risk area, the controller may perform side braking by controlling the braking device of the vehicle to prevent the vehicle from being separated from the driving lane.

In the above, it has been described that the warning and the control of the vehicle are performed under the assumption that the driver directly drives the vehicle, but is not limited thereto. The foregoing is applicable substantially the same even when the vehicle performs autonomous driving. The autonomous vehicle may also calculate a velocity vector for the following vehicle and control not to attempt a lane change according to the time to collision.

According to this, appropriate driver assistance or autonomous driving can be performed by calculating a time to collision based on the driving direction of the vehicle, the inclination between the stationary object and the relative velocity and distance of the stationary object and by performing a warning and control to prevent collision with the stationary object.

FIG. 9 is a flowchart illustrating a method for preventing a collision between a vehicle and a stationary object, according to an embodiment, and FIG. 10 is a flowchart illustrating a method for preventing a collision according to an inclination and a time to collision between a vehicle and a stationary object, according to an embodiment.

Referring to FIG. 9, the collision avoidance apparatus may acquire image data and sensing data about the outside of the vehicle and driving data of the vehicle [S310].

The collision avoidance apparatus may acquire rear image data and front image data of the vehicle through the camera module. In addition, the collision avoidance apparatus may acquire sensing data for the front and rear of the vehicle through a non-image sensor module such as a radar module. In addition, the collision avoidance apparatus may acquire vehicle velocity information, steering angle information, vehicle attitude information, yaw rate information, and the like, as driving data through the vehicle interior sensor module provided in the vehicle.

Referring back to FIG. 9, the collision avoidance apparatus may determine whether a stationary object is detected on the left or right side of the vehicle based on the image data and the sensing data [S320].

The controller of the collision avoidance apparatus may detect a stationary object on the left or right side of the vehicle based on the image data and the sensing data. According to an example, since the guard rail installed around the road have similar shapes to each other and are linearly installed at regular intervals, when the detected target is detected to be linearly distributed within a certain distance, the controller may determine the target as a stationary object such as a guard rail. However, this is merely one example, if the stationary object can be detected, but is not limited to a specific method.

If the stationary object is not detected (S320, No), the controller of the collision avoidance apparatus may not perform a warning. Thereafter, the controller may perform the process of FIG. 9 again from the beginning.

Referring back to FIG. 9, when a stationary object is detected (S320, Yes), the controller may calculate an inclination between the driving direction of the vehicle and the stationary object based on the driving data [S330]. The controller may calculate the velocity vector $V_x$ parallel to the driving lane and the velocity vector $V_y$ perpendicular to the driving lane, based on the vehicle velocity information, the steering angle information, the vehicle attitude information, the yaw rate information, and the like of the vehicle. In addition, the controller may calculate the distance between the front of the vehicle and the stationary object using the image data or the radar sensing data. The controller may calculate the inclination formed between the stationary object and the driving direction of the vehicle using the calculated information.

Referring back to FIG. 9, the collision avoidance apparatus may calculate a time to collision of the vehicle with respect to the stationary object [S340].

The controller of the collision avoidance apparatus may calculate the relative velocity and distance between the stationary object and the vehicle using the image data, the radar sensing data, and the driving data. The relative velocity of the stationary object relative to the vehicle is represented by a negative value equal to the velocity of the vehicle. That is, when the sum of the relative velocity and the velocity of the vehicle is very close to zero, only the vehicle moves while the object in front is stationary, and therefore the object in front of the vehicle is recognized as a stationary object. The controller may calculate the time to collision of the vehicle with respect to the stationary object based on the calculated relative velocity and distance.

Referring back to FIG. 9, the collision avoidance apparatus may output a warning based on the collision anticipation time and the inclination [S150].

The controller of the collision avoidance apparatus may display a warning of a collision in an area of the side mirror in the direction in which the stationary object is located. Alternatively, the controller may display a warning on a human machine interface (HMI) or a head up display (HUD). Alternatively, the controller may output acoustically or tactually a warning through the sound output module or the haptic module provided in the vehicle. Hereinafter, the warning output of the collision avoidance apparatus will be described in detail with reference to FIG. 10.

Referring to FIG. 10, the controller of the collision avoidance apparatus may determine whether the calculated inclination is equal to or greater than a predetermined angle [S410].

If the predetermined angle is set too small, the output of a warning is frequently performed to give the driver fatigue, and if the predetermined angle is set too large, collision prevention due to carelessness of the driver cannot be effectively performed, and based on this point, the predetermined angle can be set.

If the inclination is not more than a predetermined angle (S410, No), the controller may restart the process shown in FIG. 9 from the beginning without outputting a warning.

If it is determined that the inclination is greater than a predetermined angle (S410, Yes), the controller may determine whether the time to collision is within a predetermined time [S420]. According to an example, the predetermined time may be set according to the driving tendency of the driver of the vehicle 1. For example, the predetermined time may be set longer as the driver of the vehicle 1 has a tendency to inadvertently drive. In this case, a configuration for learning the driver's identification and driving tendency may be further included in the collision avoidance apparatus 100.

When the time to collision is not within a predetermined time (S420, No), the controller may output only a warning about a collision risk without controlling the steering or braking of the vehicle [S430].

When the time to collision is determined to be within a predetermined time (S420, Yes), the controller may control at least one of a steering device and a braking device of the vehicle 1 to perform the avoidance control [S440].

The controller may control the steering device of the vehicle so that the vehicle drives along the driving lane. Alternatively, the controller may perform side braking by controlling the braking device of the vehicle to prevent a collision with the stationary object.

In the above, it has been described that the warning and the control of the vehicle are performed under the assumption that the driver directly drives the vehicle, but is not limited thereto. The foregoing is applicable substantially the same even when the vehicle performs autonomous driving.

According to this, appropriate driver assistance or autonomous driving can be performed by calculating the time to collision based on the driving direction of the vehicle and the inclination between the stationary objects and the relative velocity and distance of the stationary object and by performing a warning and control to prevent a collision with an adjacent following vehicle.

The above-described embodiments may be implemented through various means. For example, the embodiments may be implemented by hardware, firmware, software, or a combination thereof.

In the case of a hardware implementation, the present embodiments may include one or more Application Specific Integrated Circuits (ASICs), Digital Signal Processors (DSPs), Digital Signal Processing Devices (DSPDs), Programmable Logic Devices (PLDs), and Field Programmable Gates Arrays (FPGAs), processors, controllers, microcontrollers, microprocessors, etc.

In the case of an implementation by firmware or software, the embodiments may be implemented in the form of an apparatus, procedure, or function for performing the functions or operations described above. The software code may be stored in a memory unit and driven by a processor. The memory unit may be located inside or outside the processor, and may exchange data with the processor by various known means.

Also, the terms "system", "processor", "controller", "component", "module", "interface", "model", "unit" generally may mean computer-related entity hardware, a combination of hardware and software, software or running software. For example, the aforementioned components may be, but are not limited to, a process driven by a processor, a processor, a controller, a control processor, an object, an execution thread, a program, and/or a computer. For example, both an application running on a controller or processor and a controller or processor can be components. One or more components may be within a process and/or an execution thread and a component may be located on one system or deployed on more than one system.

The description above is merely illustrative of the technical spirit of the present disclosure, and a person of ordinary skill in the art to which the present disclosure pertains may combine the configurations without departing from the essential characteristics of the present disclosure. Various modifications and variations may be made, including separation, substitution, and alteration. Therefore, the embodiments disclosed in the present disclosure are not intended to limit the technical spirit of the present disclosure but to describe the present disclosure, and the scope of the technical spirit of the present disclosure is not limited by these embodiments. In other words, within the scope of the present disclosure, all of the components may be selectively operated in combination with one or more. The protection scope of the present disclosure should be interpreted by the following claims, and all technical ideas within the scope equivalent thereto shall be construed as being included in the scope of the present disclosure.

DESCRIPTION OF SYMBOLS

1: vehicle
2: following vehicle
3: rear side vehicle
5: guard rail
7: target
10: collision risk range
20: cross point
30: first area
40: second area
100: controller
110: camera module
120: non-image sensor
130: communication module
140: vehicle interior sensor module
200: collision avoidance system
210: domain control unit
220: driver assistance system module

What is claimed is:
1. A collision avoidance apparatus, comprising:
a camera module disposed in a vehicle so as to have a view to an outside of the vehicle, and configured to acquire image data;
at least one non-image sensor module disposed in the vehicle so as to have a sensing area with respect to the outside of the vehicle, and configured to acquire sensing data;
a vehicle interior sensor module configured to detect driving data of the vehicle; and
a controller configured to include at least one processor for processing the image data and the sensing data,
wherein the controller is configured to:
calculate a velocity vector of a following vehicle located behind the vehicle in a driving lane in which the vehicle is driving based on at least one of the image data or the sensing data,
determine whether the following vehicle has a horizontal movement when calculating the velocity vector,
upon determining that the horizontal movement is greater than zero, calculate a collision risk range between the vehicle with the following vehicle based on the driving data and the velocity vector,
calculate a time to collision (TTC) within the collision risk range, and
output a warning based on the TTC,
wherein the controller detects a stationary object on the left or right side of the vehicle based on the image data and the sensing data, determines an inclination between the moving direction of the vehicle and the stationary object based on the driving data, and outputs the warning when the inclination is greater than or equal to a predetermined angle.

2. The collision avoidance apparatus of claim 1, wherein the controller predicts a moving path of the following vehicle moving to the left or the right of the vehicle based on the velocity vector, and determines the collision risk range according to the moving path.

3. The collision avoidance apparatus of claim 1, wherein the controller outputs the warning when the TTC is determined to be within a predetermined time.

4. The collision avoidance apparatus of claim 1, wherein the controller, when the lane change attempt of the vehicle is detected in the collision risk range, controls at least one of a steering device or a braking device of the vehicle to prevent lane departure.

5. The collision avoidance apparatus of claim 4, wherein the controller detects a lane change attempt of the vehicle in the collision risk range by using lane information detected according to at least one of the image data or the sensing data.

6. The collision avoidance apparatus of claim 1, wherein the controller determines a relative velocity and distance between the stationary object and the vehicle, determines the TTC based on the relative velocity and the distance, and controls at least one of the steering device or the braking device of the vehicle when the TTC is determined to be within a predetermined time.

7. A collision avoidance system, comprising:
a camera module disposed in a vehicle so as to have a view to an outside of the vehicle, and configured to acquire image data;
at least one non-image sensor module disposed in the vehicle so as to have a sensing area with respect to the outside of the vehicle, and configured to acquire sensing data;
a vehicle interior sensor module configured to detect driving data of the vehicle; and
a domain control unit configured to include at least one processor for processing image data and sensing data, and control at least one driver assistance system module provided in the vehicle,
wherein the domain control unit is operable to:
calculate a velocity vector of a following vehicle located behind the vehicle in a driving lane in which the vehicle is driving based at least one of the image data or the sensing data,
determine whether the following vehicle has a horizontal movement when calculating the velocity vector,
upon determining that the horizontal movement is greater than zero, calculate a collision risk range between the vehicle with the following vehicle based on the driving data and the velocity vector,
calculate a time to collision (TTC) within the collision risk range, and
output a warning based on the TTC,
wherein the domain control unit detects a stationary object on the left or right side of the vehicle based on the image data and the sensing data, determines an inclination between the moving direction of the vehicle and the stationary object based on the driving data, and outputs the warning when the inclination is greater than or equal to a predetermined angle.

8. The collision avoidance system of claim 7, wherein the domain control unit predicts a moving path of the following vehicle moving to the left or the right of the vehicle based on the velocity vector, and determines the collision risk range according to the moving path.

9. The collision avoidance system of claim 7, wherein the domain control unit outputs the warning when the TTC is determined to be within a predetermined time.

10. The collision avoidance system of claim 7, wherein the domain control unit, when the lane change attempt of the vehicle is detected in the collision risk range, controls at least one of a steering device or a braking device of the vehicle to prevent lane departure.

11. The collision avoidance system of claim 10, wherein the domain control unit detects a lane change attempt of the vehicle in the collision risk range by using lane information detected according to at least one of the image data or the sensing data.

12. The collision avoidance system of claim 7, wherein the domain control unit determines a relative velocity and distance between the stationary object and the vehicle, determines the TTC based on the relative velocity and the distance, and controls at least one of the steering device or the braking device of the vehicle when the TTC is determined to be within a predetermined time.

13. A collision avoidance method, comprising:
acquiring image data and sensing data of an outside of a vehicle and driving data of the vehicle;
calculating a velocity vector of a following vehicle located behind the vehicle in a driving lane in which the vehicle is driving, based on at least one of the image data or the sensing data;
determining whether the following vehicle has a horizontal movement when calculating the velocity vector,
upon determining that the horizontal movement is greater than zero, calculating a collision risk range between the vehicle and the following vehicle based on the driving data and the velocity vector;
calculating a time to collision (TTC) within the collision risk range;
outputting a warning based on the TTC;
detecting a stationary object on the left or right side of the vehicle based on the image data and the sensing data,
determining an inclination between the moving direction of the vehicle and the stationary object based on the driving data, and
outputting the warning when the inclination is greater than or equal to a predetermined angle.

14. The collision avoidance method of claim 13, wherein the calculating a collision risk range includes predicting a moving path of the following vehicle moving to the left or the right of the vehicle based on the velocity vector, and determining the collision risk range according to the moving path.

15. The collision avoidance method of claim 13, further comprising outputting the warning when the TTC is determined to be within a predetermined time.

16. The collision avoidance method of claim 13, further comprising: controlling at least one of a steering device or a braking device of the vehicle to prevent lane departure when a lane change attempt of the vehicle is detected in the collision risk range.

17. The collision avoidance method of claim 16, further comprising: detecting a lane change attempt of the vehicle in the collision risk range by using lane information detected according to at least one of the image data or the sensing data.

* * * * *